United States Patent [19]

Barclay

[11] Patent Number: 5,033,221

[45] Date of Patent: * Jul. 23, 1991

[54] FISHNET HANGING SYSTEM

[75] Inventor: Robert W. Barclay, Seattle, Wash.

[73] Assignee: Beach & Brown, Seattle, Wash.

[ * ] Notice: The portion of the term of this patent subsequent to Feb. 21, 2006 has been disclaimed.

[21] Appl. No.: 411,943

[22] PCT Filed: Jan. 27, 1988

[86] PCT No.: PCT/US88/00221

§ 371 Date: Jul. 25, 1989

§ 102(e) Date: Jul. 25, 1989

[87] PCT Pub. No.: WO88/05259

PCT Pub. Date: Jul. 28, 1988

Related U.S. Application Data

[63] Continuation-in-part of Ser. No. 8,221, Jan. 27, 1987, Pat. No. 4,805,334, which is a continuation-in-part of Ser. No. 762,003, Aug. 2, 1985, Pat. No. 4,763,432.

[51] Int. Cl.$^5$ .............................................. A01K 71/00
[52] U.S. Cl. ............................................ 43/7; 43/9.1; 43/14
[58] Field of Search ............................. 43/7, 10, 14, 9

[56] References Cited

U.S. PATENT DOCUMENTS

| | | |
|---|---|---|
| 822,694 | 6/1906 | Shepherd . |
| 1,333,224 | 3/1920 | Sperry . |
| 3,013,356 | 12/1961 | Luketa ...................................... 43/9 |
| 3,165,853 | 1/1965 | Ansell ...................................... 43/7 |
| 3,213,560 | 10/1965 | Phillips ...................................... 43/7 |
| 3,955,305 | 5/1976 | Roberts ............................... 43/44.91 |
| 4,805,334 | 2/1989 | Barclay ................................... 43/14 |

FOREIGN PATENT DOCUMENTS 607692 11/1960 Canada .
672589 10/1963 Canada .
36-8676 1/1960 Japan .

Primary Examiner—Kurt Rowan
Attorney, Agent, or Firm—Ward Brown; Robert W. Beach

[57] ABSTRACT

Separate anchor members (1, 1', 1'', 1''', 40, 60, 70, 80, 80', 80'') are secured at regularly spaced locations to a rope or line (L) to which a net (N) is to be coupled. The anchor members carry separate connectors (11, 11', 11'', 11''', 50, 65, 65', 12''') which, in turn, are adapted to be connected to the net. The connectors can have closed loops (14, 15, 14', 15') to be threaded through a selvage portion of the net and interwoven with the loops of connectors of the adjacent anchor members.

3 Claims, 9 Drawing Sheets

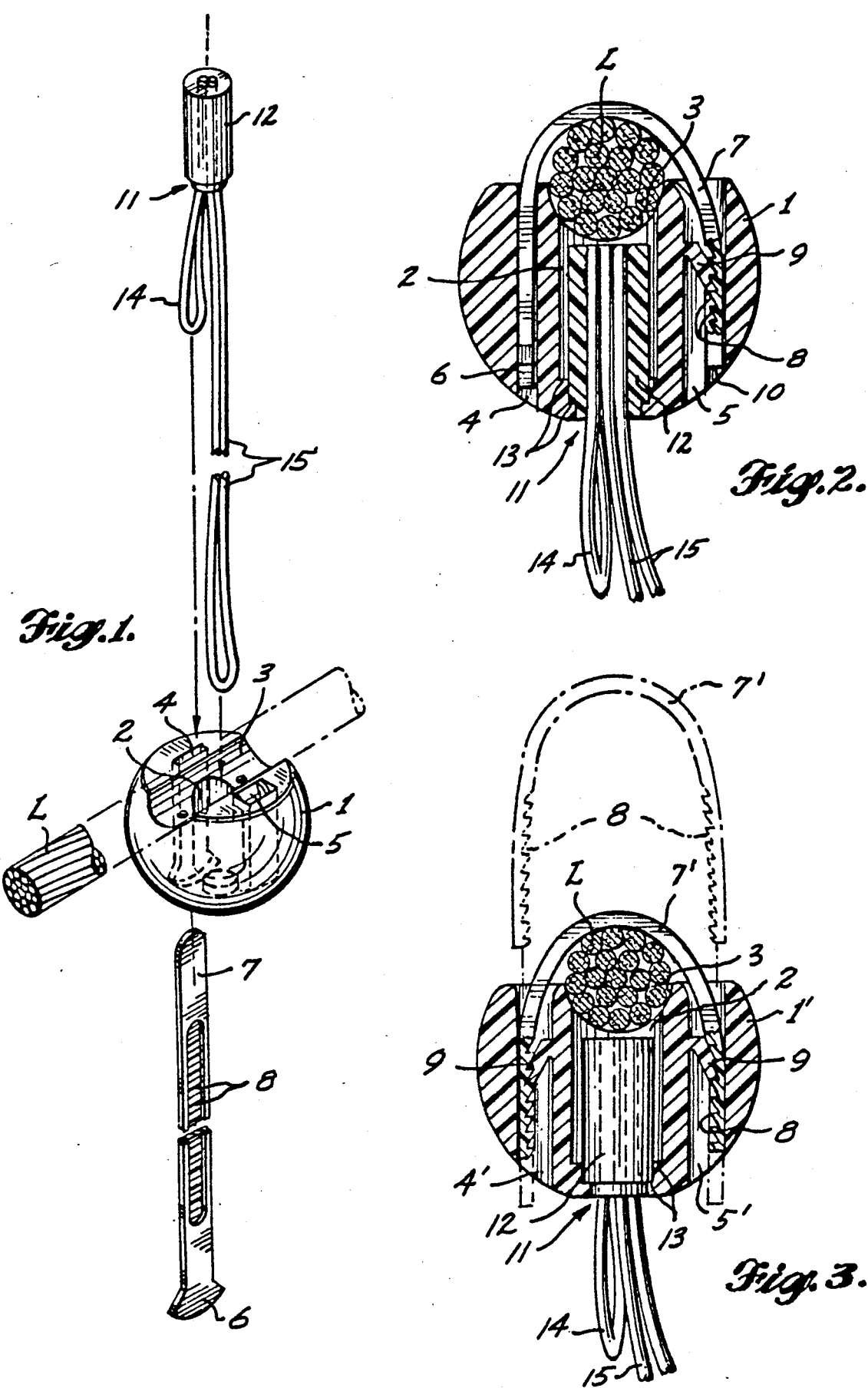

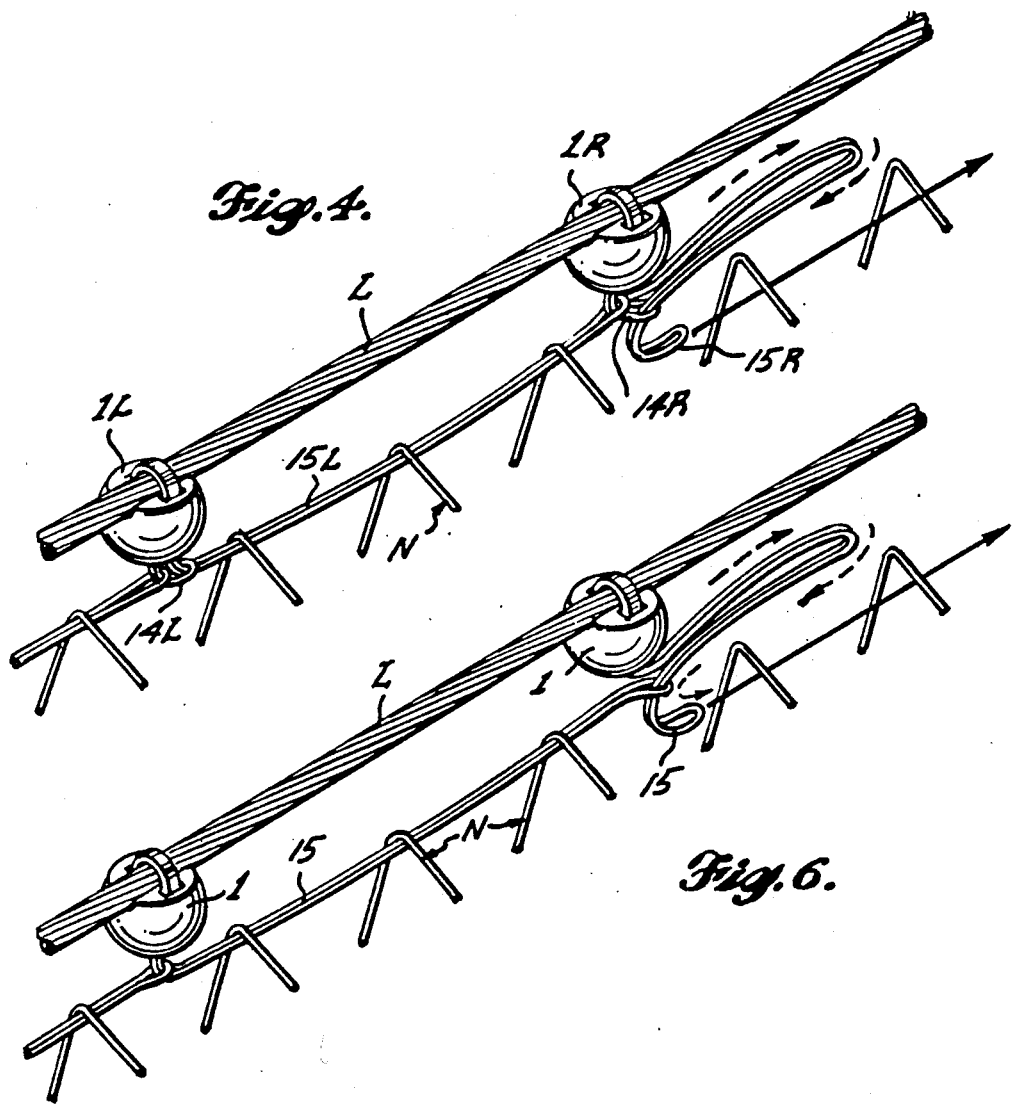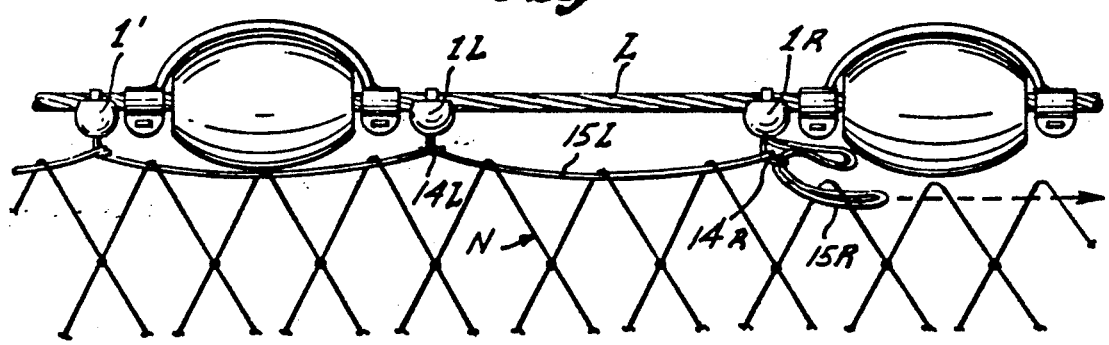

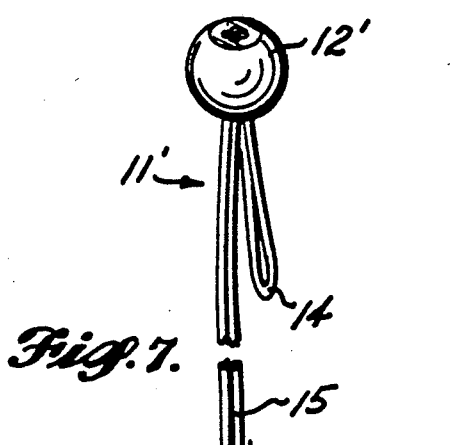
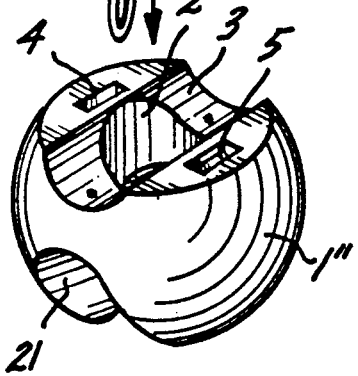
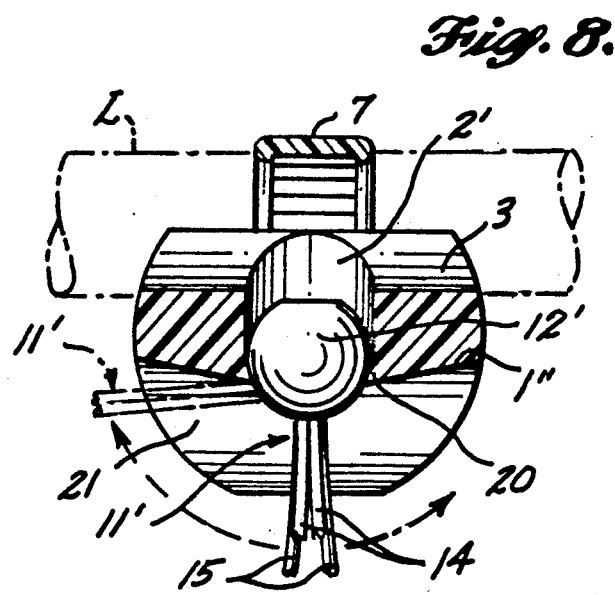
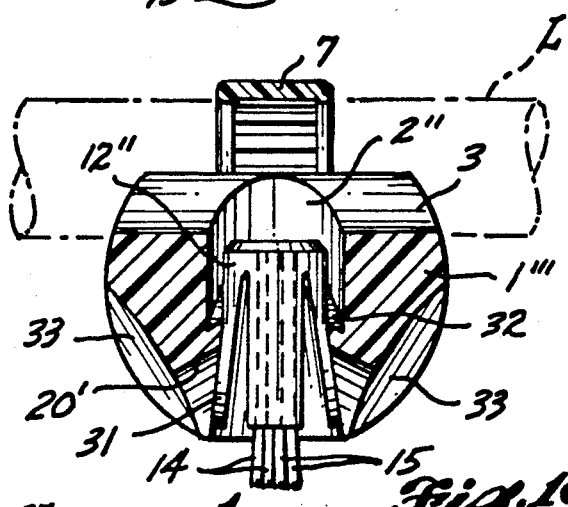
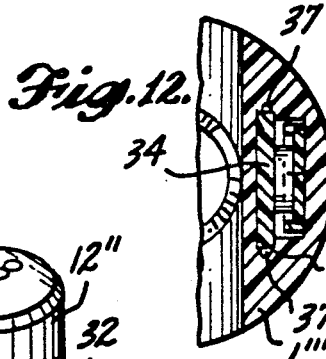
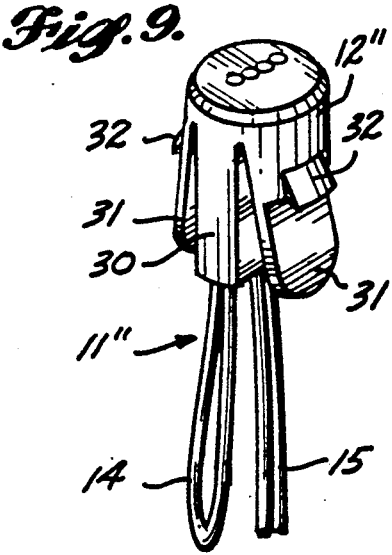
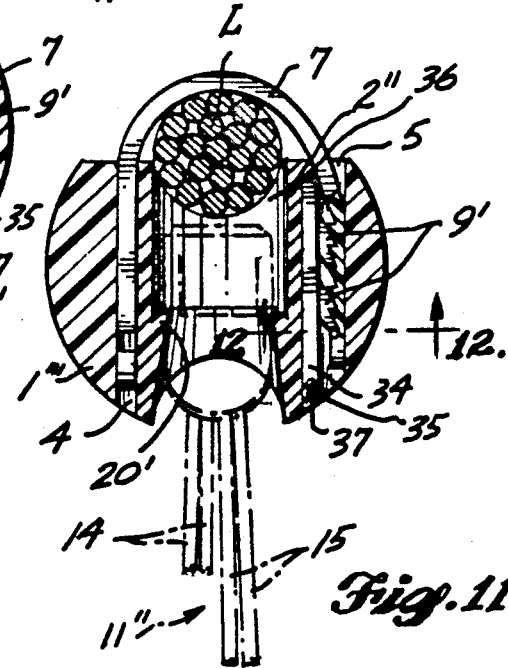

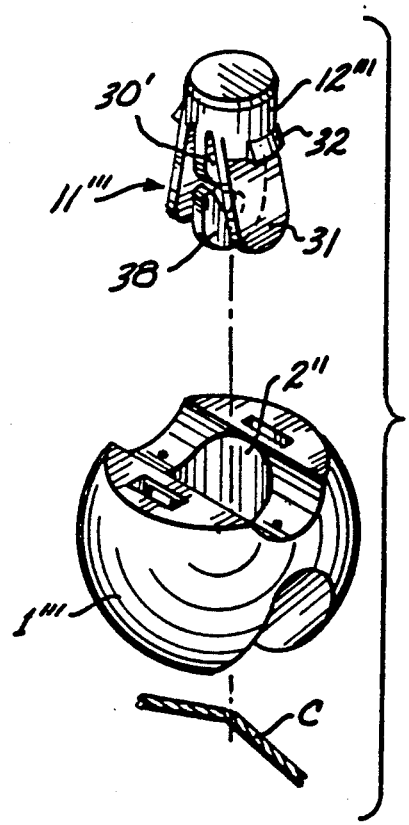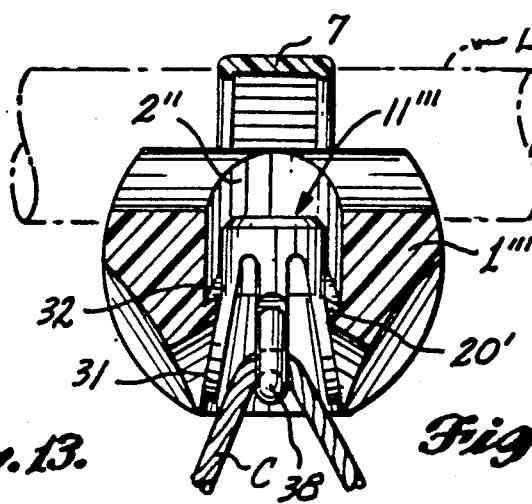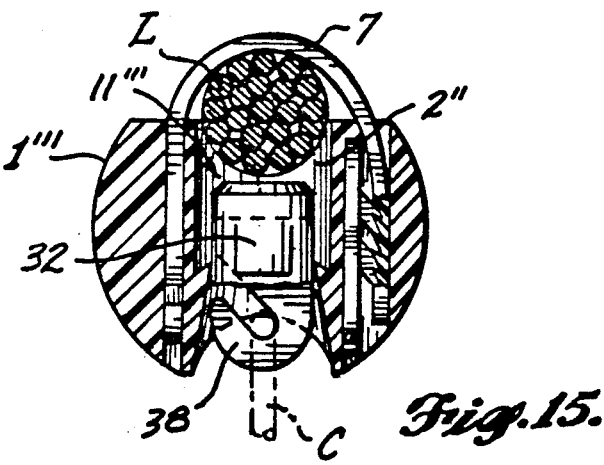
Fig. 13.
Fig. 14.
Fig. 15.

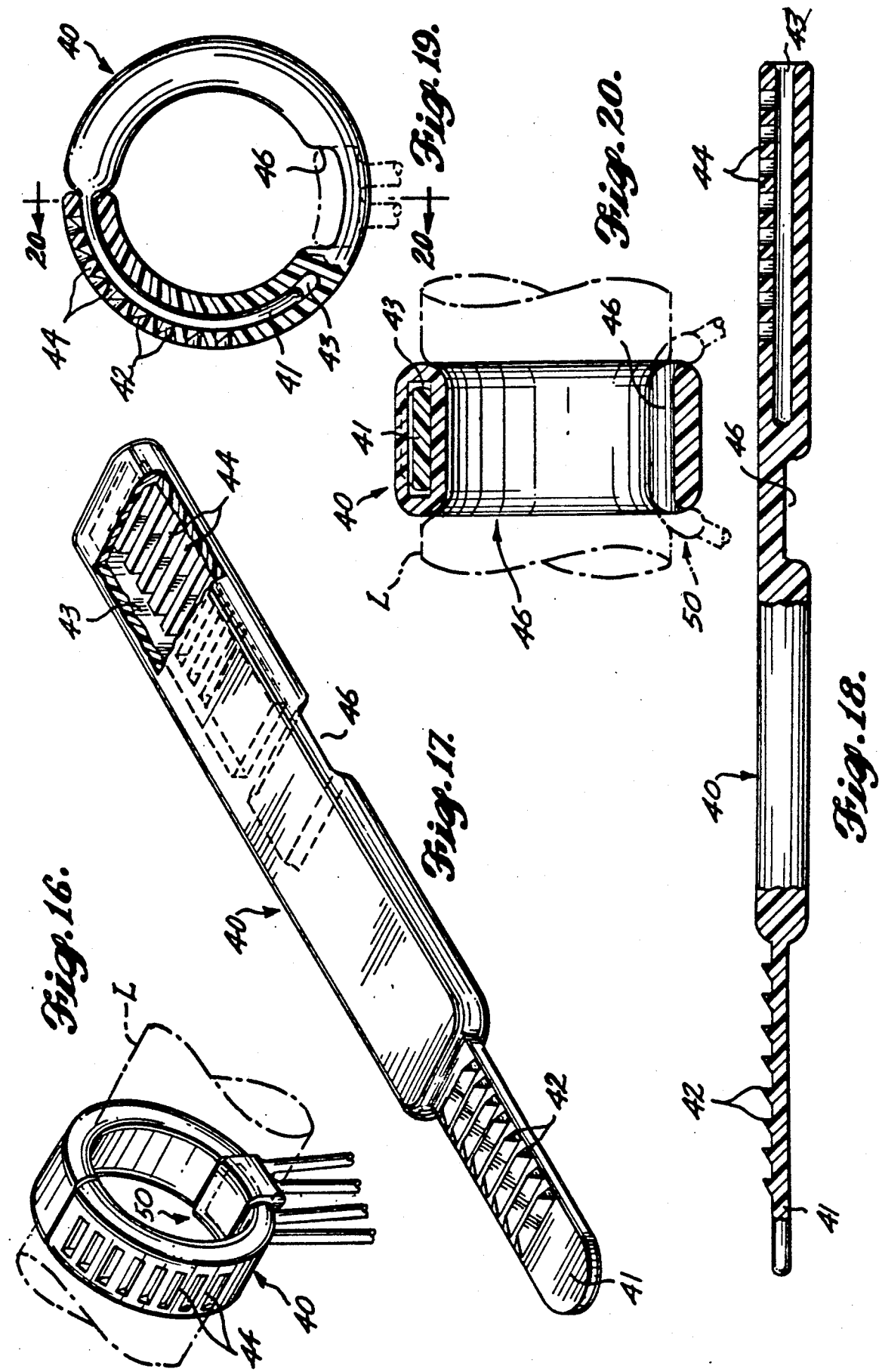

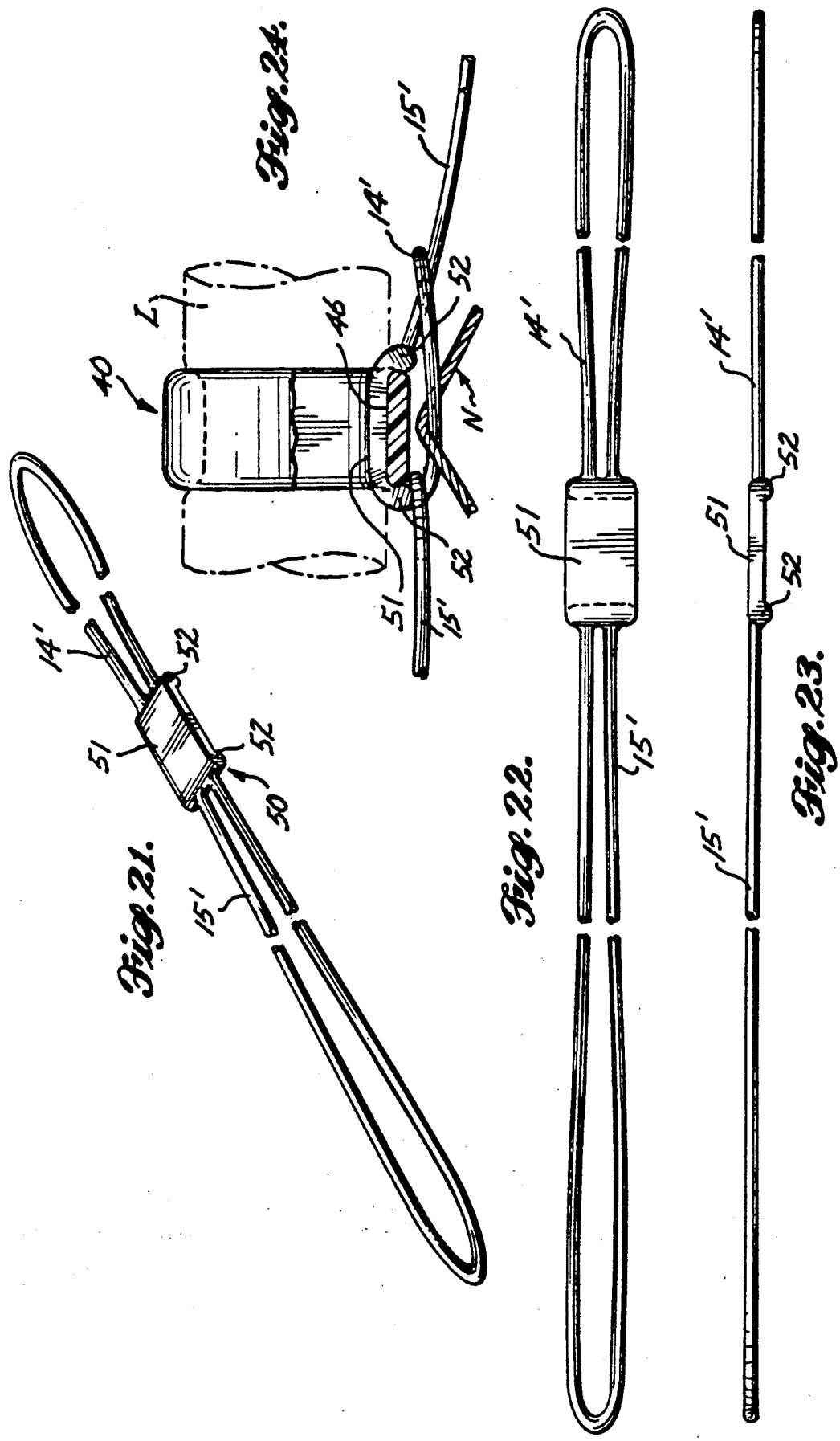

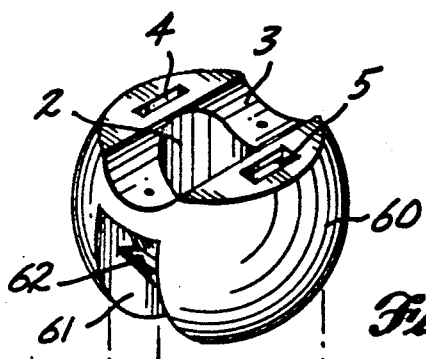
Fig. 25.
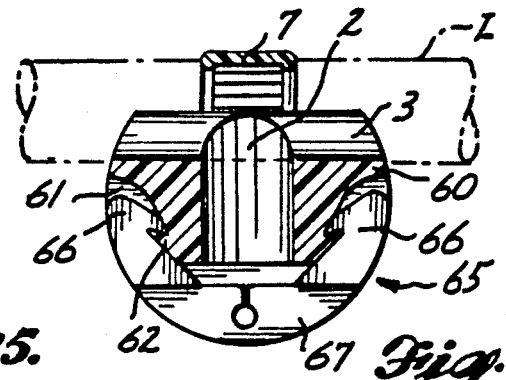
Fig. 26.
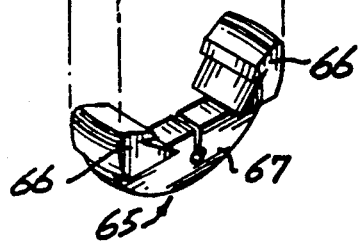
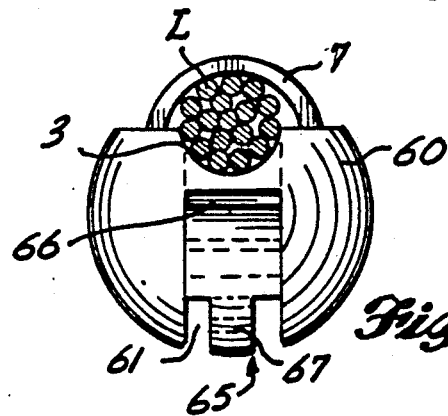
Fig. 27.
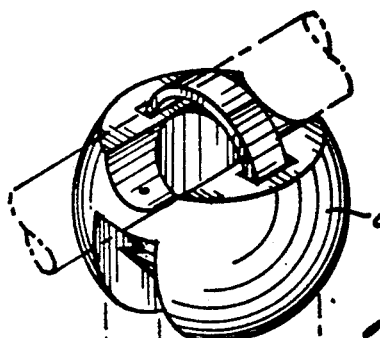
Fig. 28.
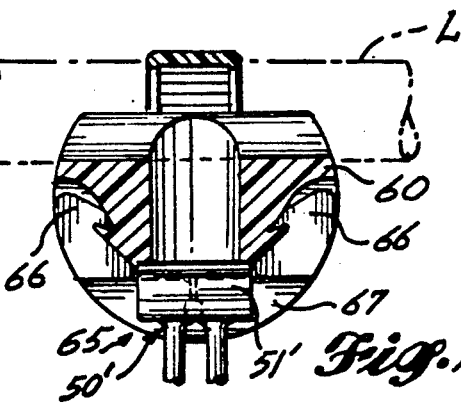
Fig. 29.
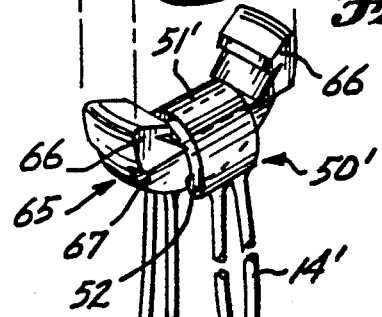
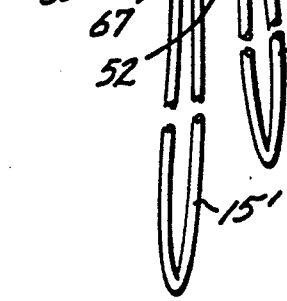
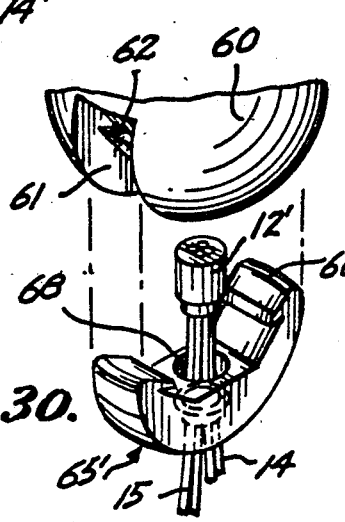
Fig. 30.
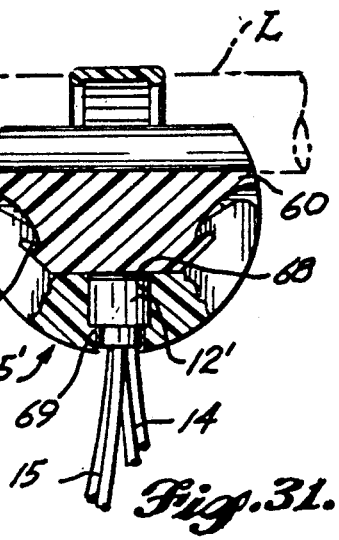
Fig. 31.

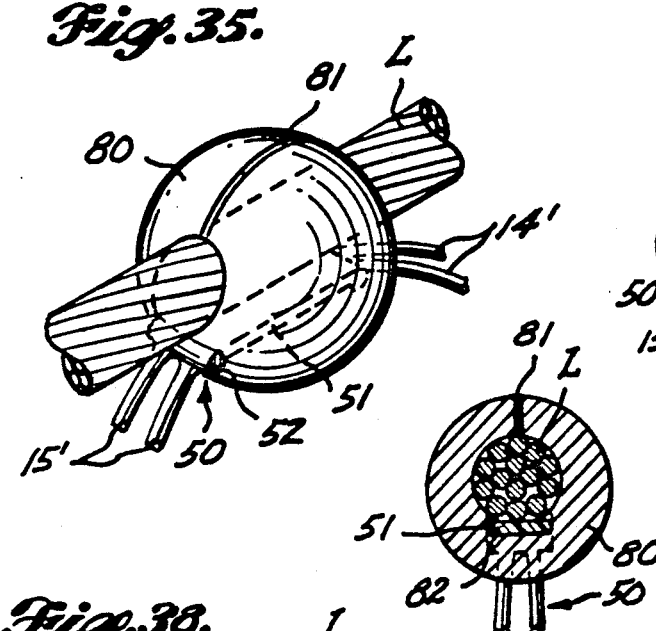
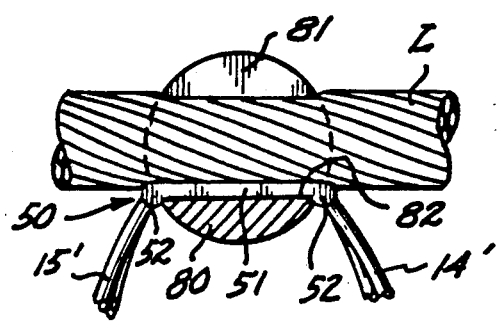
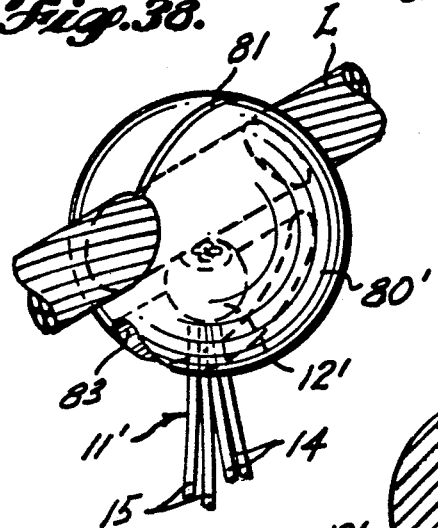
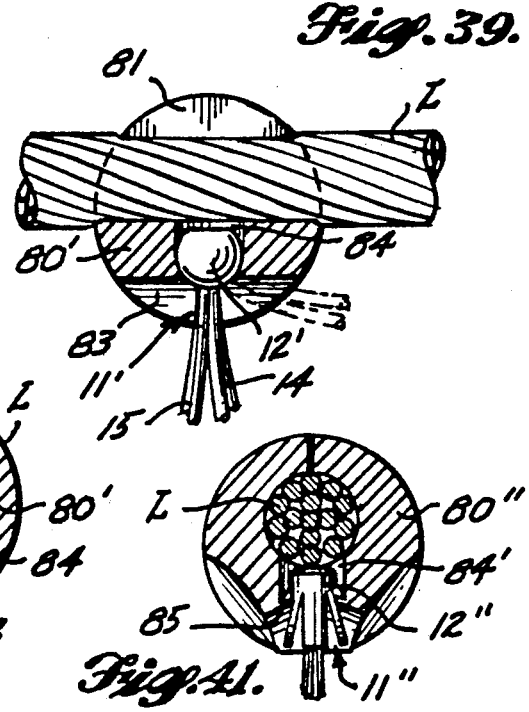
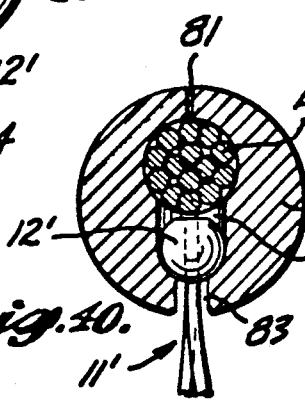
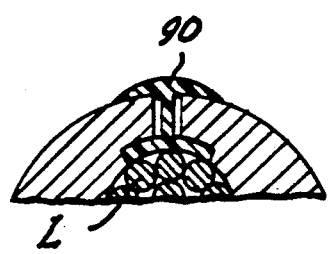
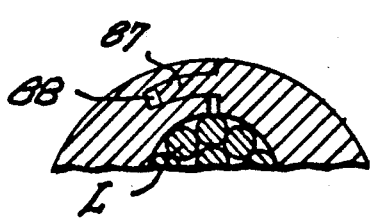

FISHNET HANGING SYSTEM

CROSS REFERENCE

This application is a continuation-in-part of application Ser. No. 008,221, filed Jan. 27, 1987, issued as U.S. Pat. No. 4,805,334, on Feb. 21, 1989, which was a continuation-in-part of application Ser. No. 762,003, filed Aug. 2, 1985, issued as U.S. Pat. No. 4,763,432, on Aug. 16, 1988.

TECHNICAL FIELD

The present invention relates to mechanism for coupling a net to a cylindrical length, and particularly to mechanism for coupling at least one selvage of a fishnet to a line such as a corkline or a lead line.

BACKGROUND ART

Known gill nets have a top corkline consisting of a rope carrying spaced floats, a bottom lead line, usually a rope with internal weights, and a central net or web. The traditional method of "hanging" the net, i.e., coupling it at the top and bottom to the corkline and lead line, respectively, is by use of separate hanging cords which are threaded through the selvages of the net. The hanging cords are tied manually to the corkline and lead line at spaced locations.

The completed setup or shackel of gill net can be large. For example, for salmon fishing in the Bristol Bay area of Alaska the completed shackel can be 50 fathoms (76.2 meters) long and 5 to 10 fathoms (7.6 to 15.2 meters) deep. The web itself can be rolled or folded to compact condition, but the lead line and particularly the corkline are bulky.

The mesh size of the web desired depends on the size and species of the fish to be caught. Again using the example of salmon fishing in Bristol Bay, different webs may be desired for reds (sockeye), pinks (chum), silvers (Coho) and kings (Chinook). Changing webs on short notice, such as before the next tide change, may result in a greatly increased catch.

Government regulations and storage space may limit the number of complete shackels available on board, and fishing may be conducted in an area remote from shore storage or even from a tender where additional shackels might be kept. There also is substantial additional expense in acquiring, maintaining and storing additional shackels for the purpose of having webs of different mesh size conveniently available, as compared to hanging different webs from the same corkline and lead line.

For known hanging systems, it is a complicated and time-consuming process to uncouple a web from its corkline and lead line and rehang a new web. In addition, damage can occur to the corkline, web or lead line even when such process is performed by an experienced worker. Further, the time lost in changing webs can be extremely frustrating to a fisherman, particularly considering the shorter fishing seasons that can be imposed by the government.

DISCLOSURE OF THE INVENTION

The system in accordance with the present invention utilizes separate anchor blocks or members attached substantially permanently and immovably to a cylindrical length or line, such as an otherwise conventional corkline or lead line, at uniformly spaced locations. The traditional hanging cords can be replaced by connectors which have loops or lines that are affixed to and extend between the anchor members and are threaded through the adjacent selvage of the net or web. In some forms, each anchor member has a connector with two closed loops of flexible material interwoven with the loops of the adjacent anchor members. In another form, one end of a single line is connected to one anchor member and, after the line is threaded through the adjacent net selvage, the other end is secured to the next anchor member. Such next anchor member also receives an end of another single line extending to the next anchor member, and so on.

The system is used for quickly and reliably coupling a fishnet or web to the corkline, lead line or other cylindrical length, using simple and inexpensive but durable components, and is usable by unskilled workers while still resulting in a uniform and reliable hanging of the web. The system also allows the web to be uncoupled from the corkline and lead line quickly and easily but does not result in damage to the reusable components of the fishnet set up or shackel when the web is uncoupled. The system is adaptable for fishing in heavy seas and for compact storage without tangling.

BRIEF DESCRIPTION OF THE DRAWINGS

FIG. 1 is a somewhat diagrammatic, fragmentary, top perspective of a fishnet hanging system in accordance with the present invention, including an anchor member, a strap for clamping the anchor member to a line and a plug or swivel connector unit with loops for replacing the traditional separate hanging cord; FIG. 2 is a central vertical section through the anchor member and connector unit of the embodiment shown in FIG. 1; and FIG. 3 is a corresponding vertical section illustrating a slightly modified anchor member and clamping strap or staple;

FIG. 4 is a fragmentary top perspective illustrating attachment of a net to a line by use of components in accordance with FIGS. 1 and 2; and FIG. 5 is a fragmentary side elevation illustrating the same attaching method;

FIG. 6 is a fragmentary top perspective illustrating an alternative manner of attachment of a net to a line by use of further modified components in accordance with the present invention;

FIG. 7 is a somewhat diagrammatic top perspective of components of another fishnet hanging system in accordance with the present invention, including an anchor member and connector unit with loops; and FIG. 8 is a somewhat diagrammatic, central, vertical section through the anchor member and connector unit of the embodiment shown in FIG. 7 with parts broken away;

FIG. 9 is a top perspective of a modified connector unit with loops; FIG. 10 is a central vertical section of components of a fishnet hanging system in accordance with the present invention utilizing the connector unit of FIG. 9; FIG. 11 is an end elevation of such components, rotated about an upright axis through an angle of 90 degrees relative to FIG. 10, with parts broken away; and FIG. 12 is a fragmentary section along line 12—12 of FIG. 11;

FIG. 13 is a top perspective of components of a fishnet hanging system in accordance with the present invention, including an anchor member and a connector unit which unit is modified to accommodate a separate hanging cord; FIG. 14 is a central vertical section through such components in assembled relationship; and FIG. 15 is an end elevation of such components, rotated about an upright axis through an angle of 90 degrees relative to FIG. 14, with parts broken away;

FIG. 16 is a top perspective of still another fishnet hanging system in accordance with the present invention, including an anchor member and a connector unit with flexible loops; FIG. 17 is a top perspective of the anchor member of FIG. 16 in its flat unrolled condition; FIG. 18 is a side elevation of such anchor member in such flat unrolled condition with parts broken away; and FIG. 19 is an end elevation of such anchor member in its rolled or ring condition with parts broken away; FIG. 20 is a section along 20—20 of FIG. 19;

FIG. 21 is a top perspective of the connector unit used in the embodiment of FIG. 16; FIG. 22 is a top plan of such connector unit; FIG. 23 is a side elevation of such connector unit; and FIG. 24 is a somewhat diagrammatic end elevation illustrating how anchor member and connector components in accordance with FIGS. 15 through 22 can be used to couple a net to a cylindrical length;

FIG. 25 is a top perspective of components of another fishnet hanging system in accordance with the present invention, including an anchor member and a connector unit attachable to the anchor member and adapted to receive and hold a hanging line; FIG. 26 is a side elevation of such components with parts broken away; and FIG. 27 is an end elevation of such components;

FIG. 28 is a top perspective of components of another fishnet hanging system in accordance with the present invention, including an anchor member clamped to a line and a connector unit of the general type shown in FIGS. 25 through 27 but adapted for holding another connector unit with loops; and FIG. 29 is a side elevation of such components with parts broken away;

FIG. 30 is a fragmentary top perspective of further modified components of a fishnet hanging system in accordance with the present invention, including an anchor member and a connector unit similar to the units of FIGS. 25 and 28; and FIG. 31 is a central vertical section through the anchor member and connector unit of the embodiment of FIG. 30;

FIG. 35 is top perspective of components of another modified fishnet hanging system in accordance with the present invention, including an anchor member clamped to a line without a strap and a connector unit carried by such anchor member and having flexible loops; FIG. 36 is a side elevation of such components with parts broken away; and FIG. 37 is an end elevation of such components with parts broken away;

FIG. 38 is a top perspective of further modified components of a fishnet hanging system in accordance with the present invention, including an anchor member clamped to a line without a strap and a connector unit carried by such anchor member and having flexible closed loops; FIG. 39 is a side elevation of the modified components shown in FIG. 38 with parts broken away; and FIG. 40 is an end elevation of such components with parts broken away;

FIG. 41 is a side elevation of still further modified components of a fishnet hanging system in accordance with the present invention, including an anchor member of the same general type as the anchor members of FIGS. 35 and 38;

FIG. 42 is an enlarged detail section of adjacent ends of an anchor member of the type shown in FIGS. 35 and 38 fitted in a separate clip; and FIG. 43 is an enlarged detail section of modified adjacent end portions of an anchor member of the general type shown in FIGS. 35 and 38.

BEST MODE FOR CARRYING OUT THE INVENTION

Figure 32:
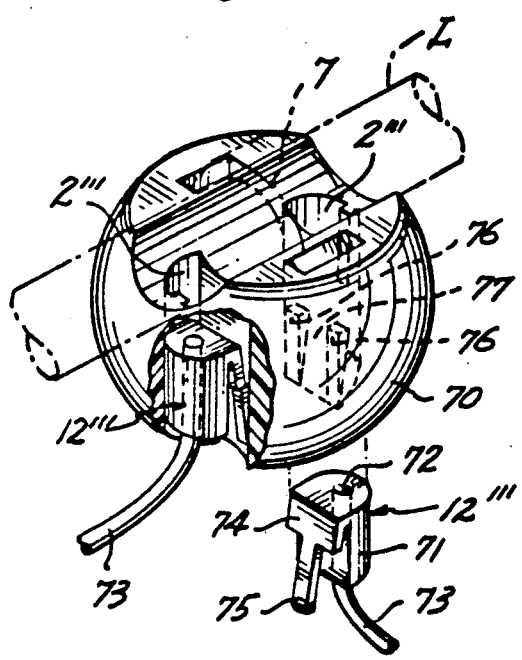
FIG. 32 is a somewhat diagrammatic, fragmentary, top perspective of components of yet another modified fishnet hanging system in accordance with the present invention.

The fishnet hanging system in accordance with the present invention is used to couple a net or web to a cylindrical length. Usually the cylindrical length will be a rope or line such as a conventional top corkline or a conventional bottom lead line of a fishnet assembly. In general, the improved hanging system includes separate anchor members secured to the cylindrical length or line at, preferably, uniformly spaced locations and connector units which can be coupled to the net and which, in turn, are carried by or coupled to the anchor members.

In the embodiment shown in FIGS. 1 and 2, each anchor member is a generally spherical block 1 of rigid plastic material. The block has a central upright through bore 2 and an arcuate, preferably semicylindrical, horizontally extending notch or cutout 3 at its top for receiving the cylindrical length or line L to which such member or block 1 is to be connected. The anchor member has through slots 4 and 5 at opposite sides of its central bore 2 and the top cutout 3. The bottom end portion of the slot 4 at one side is larger than its top portion for receiving the enlarged head 6 of a plastic cable tie having a long flexible tail 7 with ratchet teeth 8 on one of its flat surfaces. As seen in FIG. 2, the slot 5 at the other side is of substantially uniform cross section, but a ratchet finger or pawl 9 integral with the remainder of the anchor member projects downward and outward from the inner wall of slot 5.

To secure the anchor block 1 to the line L, the cable tie tail 7 is threaded upward through slot 4 and is wrapped over the top of the line, and then is inserted downward through slot 5 to the position shown in FIG. 2. The free end portion of the tail is pulled tight and its inner ratchet teeth 8 slide successively past the inner ratchet arm or pawl 9 which has complemental teeth at its outer end. With such tail 7 under substantial tension, the tail is cut close to the bottom periphery of the anchor block 1. Because the lines and/or the plastic cable ties are somewhat resilient, the cut end 10 of the tail snaps back into the slot 5. The upper portion of the tail 7 looped over the line L, however, is retained under tension by the inner locking of pawl 9 with the tie ratchet teeth 8. Preferably the tension is sufficient to fix the anchor block immovably relative to the line L by indenting the anchor block and cable tie into the line.

In the modified construction shown in FIG. 3, a modified anchor member or block 1' can have a ratchet arm or pawl 9 in each of the slots 4' and 5' opposite its central bore 2, and the strap can be a flexible or semirigid or rigid U-shaped tie or staple 7' with ratchet teeth 8 along the inner sides of its opposite upright legs. The tie or staple 7' can be forced downward to clamp the anchor block 1' to its line L and, preferably, indent the block and staple into the line. The embodiment of FIG. 3 may be better adapted to attachment of the anchor blocks to a cylindrical length or line by use of automatic machinery.

The connector unit 11 used with the embodiments shown in FIGS. 1 through 3 has a rigid cylindrical top portion or plug 12 fitted in the central upright bore 2 of its anchor block 1 or 1' as best seen in FIGS. 2 and 3. The bottom end portion of such plug is stepped to match the stepped bottom end portion of the anchor block bore which forms the short shoulders 13. The connector can rotate freely relative to the anchor member.

The cylindrical connector plug 12 has its own central bore receiving the ends of two loops 14 and 15 of flexible cord or line such as heavy monofilament fishing line. The ends of each of the closed loops can be glued in the connector bore or sonically welded or otherwise fused or securely attached. As best seen in FIG. 1, one of the loops, loop 14, is substantially shorter than the other loop, loop 15. As seen in FIGS. 4 and 5, the loops 14 and 15 extending from the anchor block connectors can be used for securing the net or web N to the line L carrying the anchor members, thereby eliminating the need for a separate hanging cord. In FIG. 4 the anchor block shown at the left is numbered 1L and its loops 14L and 15L, and the block shown at the right is numbered 1R and its loops 14R and 15R. The corresponding blocks and their loops are correspondingly numbered in the side elevation of FIG. 5. The long loop 15L from block 1L is threaded through the selvage of net N. Then the shorter loop 14R of block 1R is threaded through the closed end of the longer loop 15L from the preceding block 1L. Next, the longer loop 15R is inserted through the closed end of the short adjacent loop 14R. Finally the longer loop 15R is threaded through the next loops of selvage to the next anchor block and the procedure is continued so that the long and short loops are interwoven for connecting the net N to the line L.

An advantage of the weaving procedure illustrated in FIGS. 4 and 5 is that no more than a few loops 14 and 15 will unravel if any loop is severed. In some applications, however, it may be desirable to speed up disconnection of the line L from the net N, in which case the embodiment shown in FIG. 6 can be used. In that embodiment the short loops have been deleted and each long loop 15 is inserted through the closed end of the preceding loop. Cutting the last loop will quickly unravel the chain to free the net N from line L.

In the embodiment shown in FIGS. 7 and 8, the connector unit 11' has a spherical upper portion or plug 12' from which the short and long flexible loops 14 and 15 extend. The anchor member 1" for the connector unit 11' is very similar to the anchor member 1 shown in FIGS. 1 and 2. Such anchor member 1" includes the through slots 4 and 5 at opposite sides of the top concave cutout 3 for receiving the line to which the anchor member is to be attached. As in the embodiment of FIGS. 1 and 2, a pawl is provided inside the slot 5 for retaining a cable tie strap 7 looped over the line to indent or partially embed the anchor member into the line.

Similar to the embodiment of FIGS. 1 and 2, the modified anchor member 1" shown in FIGS. 7 and 8 has a central upright bore 2' opening into the concave cutout 3. The bottom end portion of bore 2' is curved gently inward to form a lip or seat 20 to retain the spherical connector plug 12' while permitting it to swing and swivel in the bore 2'. The bottom portion of the modified connector 1' has a downward-opening groove 21 extending generally parallel to the length of the top cutout 3. Consequently, as best seen in FIG. 8, not only can the composite connector 11' swivel or rotate relative to the modified anchor member 1" about an upright axis, it is free to rotate about a transverse horizontal axis permitting swinging of the loops 14 and 15 in a plane containing the axis of the line L. Such swinging movement may be particularly desirable when the net assembly is rolled on a reel or pulled over the pulley of a power block.

After securing of the modified anchor members 1" at uniformly spaced locations on the line L, a net can be connected by interweaving the loops 14 and 15 as described with reference to FIG. 4 and 5.

In the modification shown in FIG. 9, the connector unit 11" has a top portion or plug 12" from which the flexible loops 14 and 15 extend. Plug 12" is formed of somewhat resilient plastic material with a central upright body portion 30 and downward and outward extending wings 31 which extend from the top, substantially cylindrical portion of the connector plug. Each wing 31 has an outward-projecting tab 32 undercut at the bottom.

The connector 11" shown in FIG. 9 is intended to be used with a modified anchor member 1'" shown in FIG. 10, 11 and 12. Such anchor member 1'" has the top concave cutout 3 to receive the line L and the slots 4 and 5 for the strap 7. The central bore 2" of anchor member 1'" has a circular lip 20' positioned to engage against the undersides of the tabs 32 of the connector plug 12". The connector can be secured in the anchor block 1'" by simply inserting its plug upward to wedge the wings 31 inward until the tabs 32 pass over the lip 20' whereupon the wings 31 snap outward to lock the connector in position. The connector can be removed from the block easily by manually squeezing the wings together. As best seen in FIG. 10, preferably the bottom ends of the wings are recessed into the anchor member 1'" which can have notches or grooves 33 for fingertip access to the bottom end portions of the wings. The flexible loops 4 and 15 can be interwoven with the selvage of a net as previously described.

As seen in FIGS. 11 and 12, another modification of the anchor member 1'" is that the ratchet fingers or pawls 9' are not formed integrally with the remainder of the anchor member. Rather, such awls 9' are formed as part of a separate piece 34 of generally rectangular cross section, as seen in FIG. 12. Such separate piece is inserted into the slot 5 of member 1'" by fitting its opposite side margins in vertical grooves 35 until the upper end portion of piece 34 engages the abutment 36 at the top of the slot 5. Small detent projections 37 extend from the opposite edges of piece 35 to be received in correspondingly positioned recesses in the walls of the grooves 35 to retain the separate piece 34 with its pawls 9' in position while the leading end of strap 7 is inserted. After attachment to the line L, tension of the strap 7 pulls the piece 36 upward against the abutment 36. Preferably, such tension is sufficient to partially embed the anchor member 1'" and strap 7' in the rope.

In the embodiment shown in FIGS. 13 through 5, the anchor member 1'" is identical to the anchor member shown and described with reference to FIGS. 10, 11 and 12. The connector 11'" is similar to the connector 11" shown in FIGS. 9, 10 and 11. Connector 1'" has a substantially cylindrical upper portion with downward and outward projecting wings 31 having the tabs 32 to fit over the lip 20' of the anchor member central bore 2". In the case of the embodiment of FIGS. 13, 14 and 15, however, the bottom end portion of the connector body 30' is formed in the shape of a hook 38 and no flexible loops are supplied. As seen in FIGS. 14 and 15, prior to insertion of the connector 11''', a hanging cord C threaded through the net, or a strand of the selvage of the net, can be inserted into the mouth of the hook. Preferably, the bottom portion of the central bore 2" of the anchor member 1''' is proportioned to engage the hook 38 and at least partially close its mouth to clamp the hanging cord or selvage strand securely and prevent longitudinal sliding movement of the cord or strand relative to the hook 38.

The embodiment of the present invention illustrated in FIGS. 16 through 24 uses a substantially different type of anchor member 40 which preferably is formed of flexible plastic material in the flat condition shown in FIGS. 17 and 18. One end portion of such anchor member is formed as a long straight tongue 41 with teeth 42 projecting from its otherwise flat top side. The other end portion of member 40 has a long blind bore or recess 43 of rectangular cross section of approximately the same size as the cross section of the main body of tongue 41. Member 40 can be bent or curled to the condition shown in FIGS. 16, 19 and 20 by inserting the tongue 41 into the bore 43. The teeth 42 interfit with cross ribs 44 formed at one side of the recess 43 for ratchetting tightening movement of the anchor member around the line L, as best seen in FIGS. 16 and 20. The anchor member 40 is proportioned so that with the tongue inserted full into the recess, the anchor member is partially embedded into the line L and, consequently, is securely attached and will not move lengthwise of the line.

The connector unit 50 intended for use with the modified anchor member 40 is best seen in FIGS. 21, 22 and 23. Such connector unit is of one-piece construction, being formed of flexible but, preferably, substantially nonresilient plastic material with a central rectangular web 51 and integral end loops 14' and 15' extending from such web. In use, the rectangular web portion 51 fits in a groove 46 in the inner side of the ringlike anchor member. Preferably, the thickness of the web 51 is approximately equal to the depth of the groove 46 so that the inner surface of the web 51 will be flush with the remainder of the inner surface of the anchor member 40. Web 51 can have outward-protruding beads 52 at its opposite ends to prevent sliding movement of the connector unit 50 in the groove 46 of the anchor member.

With connectors 50 fitted in anchor members 40 clamped securely and spaced uniformly lengthwise of the line L, the flexible loops 14' and 15' can be coupled to the net as previously described. More specifically, with reference to FIG. 24 the long and short loops 14' and 15' can be interwoven with the selvage of the net N such that the long loop 15' from one anchor member is locked in the shorter loop 14' of the next anchor member through which the longer loop 15' of such next anchor member is threaded.

In the embodiment illustrated in FIGS. 25, 26 and 27, an anchor member 60 of a design similar to the anchor member 1 of FIGS. 1 and 2 is used. Such anchor member 60 has the top concave cutout 3 for receiving the line L and slots 4 and 5 at opposite sides of such cutout for a ratchetting strap looped over the line to clamp the anchor member securely to the line in fixed position. As illustrated, the anchor member has a central bore 2 for a savings of plastic material, but otherwise the bore 2 is not functional in the embodiment of FIGS. 25 through 27.

A circumferential groove 61 is formed in the bottom portion of the anchor member 60. Such groove extends through an angle of slightly greater than 180 degrees with a central plane coincidental with the central plane of the top cutout 3. Outward-projecting teeth 62 are formed toward the opposite ends of the groove 61.

The connector 65 for attachment to the anchor member 60 has a substantially semicircular outer side and is sized to fit in the anchor member groove with the outer surface of the connector substantially flush with the outer surface of the anchor member. Such connector 65 has inwardly hooked ends 66 for snapping over the teeth 62 in the base of the anchor member groove 61, as seen in FIG. 26, to attach the connector to the anchor member. The narrower central web 67 of the connector has an inward-opening slot communicating with a larger hole to receive a hanging line or cord, or for receiving a strand of the net selvage.

Alternatively, as illustrated in FIGS. 28 and 29, the anchor member 10 and the connector component 65 can be used with a looped connector 50' of the same general design as the connector 50 shown in FIGS. 21, 22 and 23. The central rectangular web 51' of such connector 50' can be fitted over the web 67 connecting the hooked ends 66. The protruding beads 52 limit lengthwise sliding movement of the end loops 14' and 15' which can be interwoven with the net selvage as previously described.

In the modification illustrated in FIGS. 30 and 31, the connector 65' has the hooked ends 66 for fitting over the teeth 62 in the base of the groove 61 of the anchor member 60. The anchor member is identical to the member shown in FIGS. 25 and 28 except that the central bore has been deleted. Connector 65' has its own central upright bore 68 with a bottom lip or step 69 for retaining the rigid upper end portion or plug 12' from which flexible long and short loops 14 and 15 extend.

Figure 33:
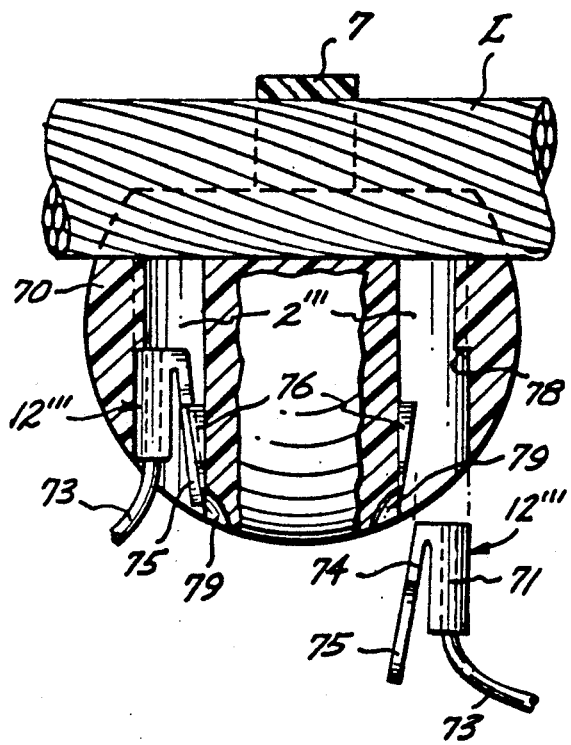
FIG. 33 is a somewhat diagrammatic side elevation such components of the system illustrated in FIG. 32 with parts broken away.
Figure 34:
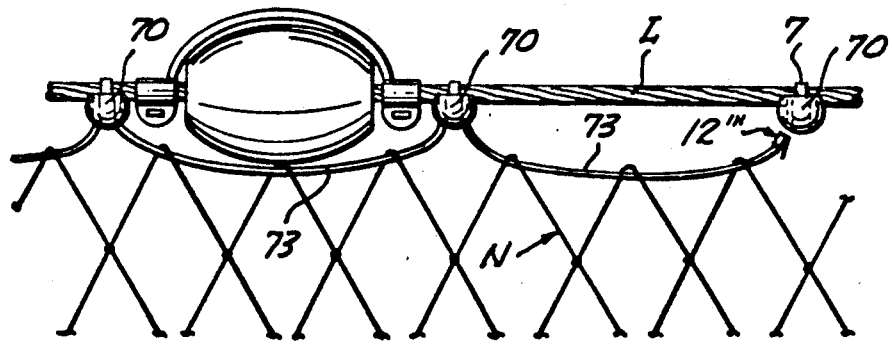
FIG. 34 is a diagrammatic side elevation illustrating attachment of a net to a line by use of components in accordance with FIGS. 32 and 33.

Still another embodiment of the present invention is illustrated in FIGS. 32 through 34 where a modified form of anchor member or block 70 is used. Such block can be connected to a line L by a tie or strap 7 as in the embodiment of FIGS. 1 and 2. Rather than providing a single, central, upright bore, however, block 70 has two side-by-side upright bores 2''' each for receiving a plug type connector 12'''. As best seen in FIGS. 32 and 33, the bores and connectors are of generally complemental cross section, namely, substantially semicircular. Each plug has a body portion 71 with a bore 72 for receiving an end of a flexible cord or line 73. A bendable tab 74 is inclined downward and outward from its body 71 and has a narrow tail 75. As a plug connector 12''' is inserted into its bore 2''', the bendable tab 74 is forced inward by inward-projecting, transversely spaced ramps or wedges 76 extending inward from the inner side of the bore 2'''. When the plug connector 12''' has been sufficiently inserted, the tab 74 springs outward with its tail 75 received in the space 77 between the wedges 76. Additional inward movement of the plug connector 12''' is prevented by a shoulder 78 formed in the bore 2''' as best seen toward the right of FIG. 33. In its fully inserted position, the tail 75 of a plug connector 12''' is recessed slightly inward into its bore 2'''. Preferably there is a small arcuate notch 79 adjacent to the inner side of each bore for fingertip access to the tab tail 75, allowing it to be pinched inward so as to permit removal of the plug connector 12'''. As seen in FIG. 34, the plug connectors can be secured to the opposite ends of lines 73 which can be threaded through the selvage of the net N and connected to adjacent anchor blocks 70 for connecting the net to the line L.

FIGS. 35 through 43 illustrate embodiments of the present invention in which anchor members are securely attached to a line L without the use of a ratcheting strap. In the form shown in FIGS. 35 through 37, the anchor member 80 is a ring of substantially rigid but bendable material having opposite ends 81 spaced apart so that the anchor member can be inserted over the line L. The line is received in the generally cylindrical recess at the center of such member, whereupon the opposite ends of the anchor member are brought together to the condition shown in FIGS. 35 through 37 where the line is indented and the anchor member is partially embedded in the line. The central portion of the interior of the anchor member can be formed with a groove 82 so that the anchor member 80 can be used with a connector 50 of the type described with reference to FIGS. 21, 22 and 23. The rectangular central web 51 of such connector fits in the anchor member groove 81, and the beads 52 at the opposite ends of such web limit sliding of the connector in the groove. Long and short end loops 14' and 15' are formed integrally with the central web 51 and beads 52.

In the case of the anchor member 80' shown in FIGS. 38, 39 and 40, a bottom circumferential groove 83 is formed in the underside of the anchor member opposite its ends 81. In the condition illustrated with the anchor member secured to the line L, the groove extends lengthwise of the line. The bottom portion of the anchor member is formed with a bore 84 communicating between the groove 83 and the interior of the anchor member receiving the line L. The bottom portion of such bore forms a seat for the plug 12' of a connector 11' of the type described with reference to FIGS. 7 and 8. Such connector includes the downward-projecting short and long closed loops 14 and 15 of flexible line which can be interwoven to connect a net to the line L.

With reference to FIG. 41, a similar anchor member 80'' crimped over the line L can be formed with a bottom bore 84' having an inward-projecting lip 85 to catch the outward-projecting tabs of the upper plug 12'' of a connector 11'' of the type described with reference to FIGS. 9, 10 and 11.

In each of the embodiments shown in FIGS. 35 through 41, the anchor member 80, 80' or 80'' can be formed of a stiff metal material that can be bent or crimped in a press to the condition illustrated in the drawings in which the line L is indented and the anchor member is partially embedded in the line. Preferably, the resulting narrow slot between the opposite ends of the anchor member will be filled so as not to catch on the net. The slot can be filled with epoxy or the opposite ends of the anchor member can be welded together. Another option is to cover the slot with a heat-shrinkable material to eliminate any sharp edges or protrusions.

With reference to FIG. 42, another option is to form a special clip 90 of H cross section for receiving the opposite end portions of the anchor member and thereby substantially fill and cover the slot between them.

With reference to FIG. 43, the opposite ends of the anchor member also can interfit by providing a projecting tongue 87 on one end to be received in a recess 88 in the other end.

Still another option is to form an anchor member of the type shown in FIGS. 35 through 41 of plastic material which can be securely fastened to the line L at the desired fixed locations spaced lengthwise of the line. Each anchor member can be held in a press to crimp the line while its ends are fused or welded together, which also will eliminate any substantial sharp-edged slot between the opposite ends of the anchor member. The modifications of FIGS. 42 and 43 can be used in connection with plastic anchor members for which the ends are to be fused together or, with respect to the clip shown in FIG. 42, fused to the clip itself.

I claim:

1. In mechanism for coupling a net to an elongated cylindrical length, the improvement comprising several anchor blocks of rigid material each having a bore opening at the exterior thereof, means for clamping said blocks to the cylindrical length at fixed locations spaced lengthwise of the cylindrical length, several separate connectors, one for each of said blocks, each of said connectors having a portion fitted in the bore of its block and retained therein, said connectors having portions extending from their blocks for connection to the net to couple the net to said blocks, each block having a concave cutout opening at the exterior thereof for receiving the cylindrical length by movement of the cylindrical length transversely of its length into said cutout leaving a side of said cylindrical length exposed and through slots at opposite sides of said cutout, said clamping means including a generally U-shaped tie for each block having opposite legs inserted in said slots, respectively, so as to encircle the exposed side of the cylindrical length, each block having ratchet means permitting movement of the legs of its tie lengthwise through said slots in a direction to tighten the central portion of said tie around the cylindrical length and thereby clamp its block to the cylindrical length but preventing movement of the legs of said tie lengthwise in said slots in the opposite direction to loosen said tie.

2. In the mechanism defined in claim 1, the bore of each block having opposite end portions opening, respectively, at the exterior of the block and into the concave cutout.

3. In the mechanism defined in claim 2, the tie being in the form of a rigid U-shaped staple looped over the cylindrical length and having its opposite legs received, respectively, in the slots at opposite sides of the cutout.

* * * * *

UNITED STATES PATENT AND TRADEMARK OFFICE
CERTIFICATE OF CORRECTION

PATENT NO. : 5,033,221
DATED : July 23, 1991
INVENTOR(S) : ROBERT W. BARCLAY

It is certified that error appears in the above-identified patent and that said Letters Patent is hereby corrected as shown below:

On the title page, first column, item [*] should be amended to read:

--[*] Notice: The portion of the term of this patent subsequent to Aug. 16, 2005 has been disclaimed.--

Signed and Sealed this

Sixteenth Day of February, 1993

*Attest:*

STEPHEN G. KUNIN

*Attesting Officer*   *Acting Commissioner of Patents and Trademarks*